Jan. 1, 1929.
O. H. PIEPER ET AL
1,697,287
UNITARY DENTAL APPARATUS
Original Filed Sept. 5, 1917    6 Sheets-Sheet 1
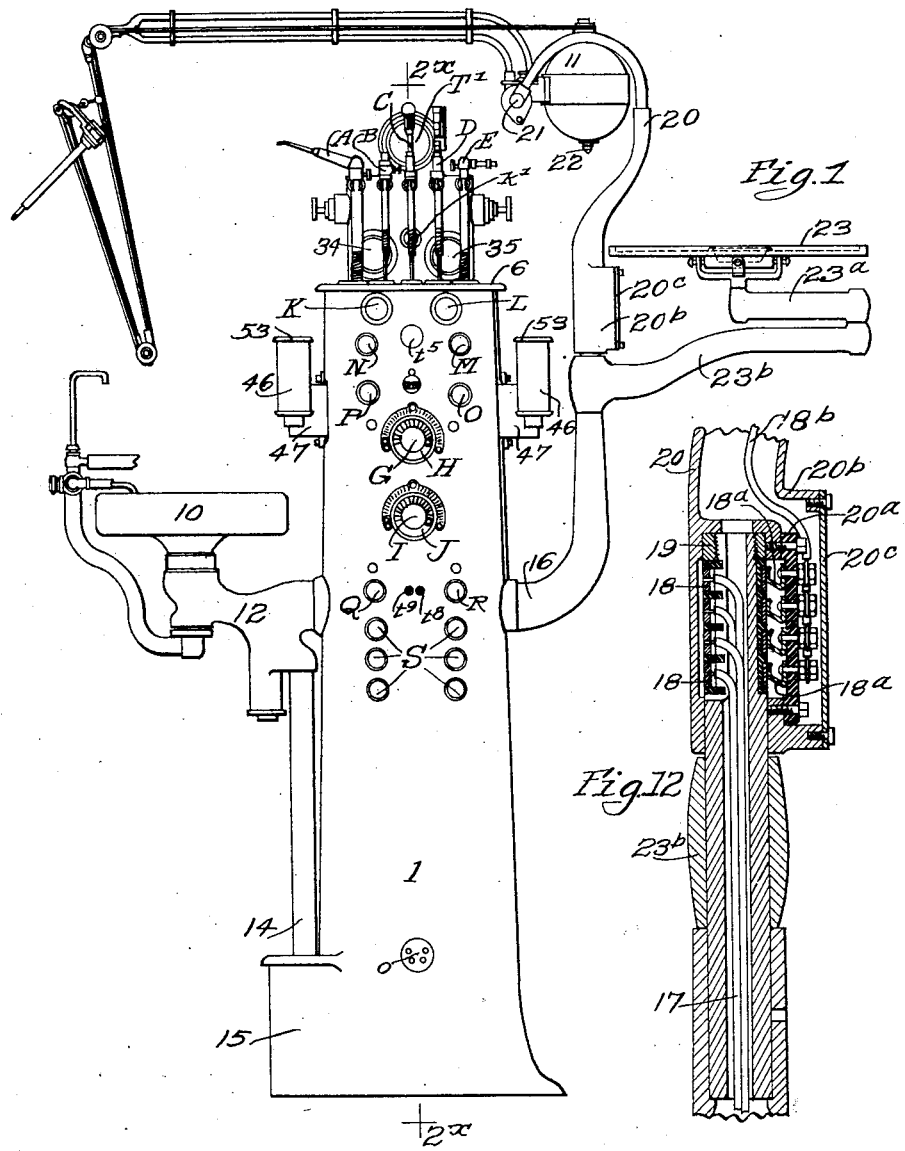
INVENTORS:
OSCAR H. PIEPER
ALPHONSE F. PIEPER
By Brown, Boettcher and Dienner
ATTYS.

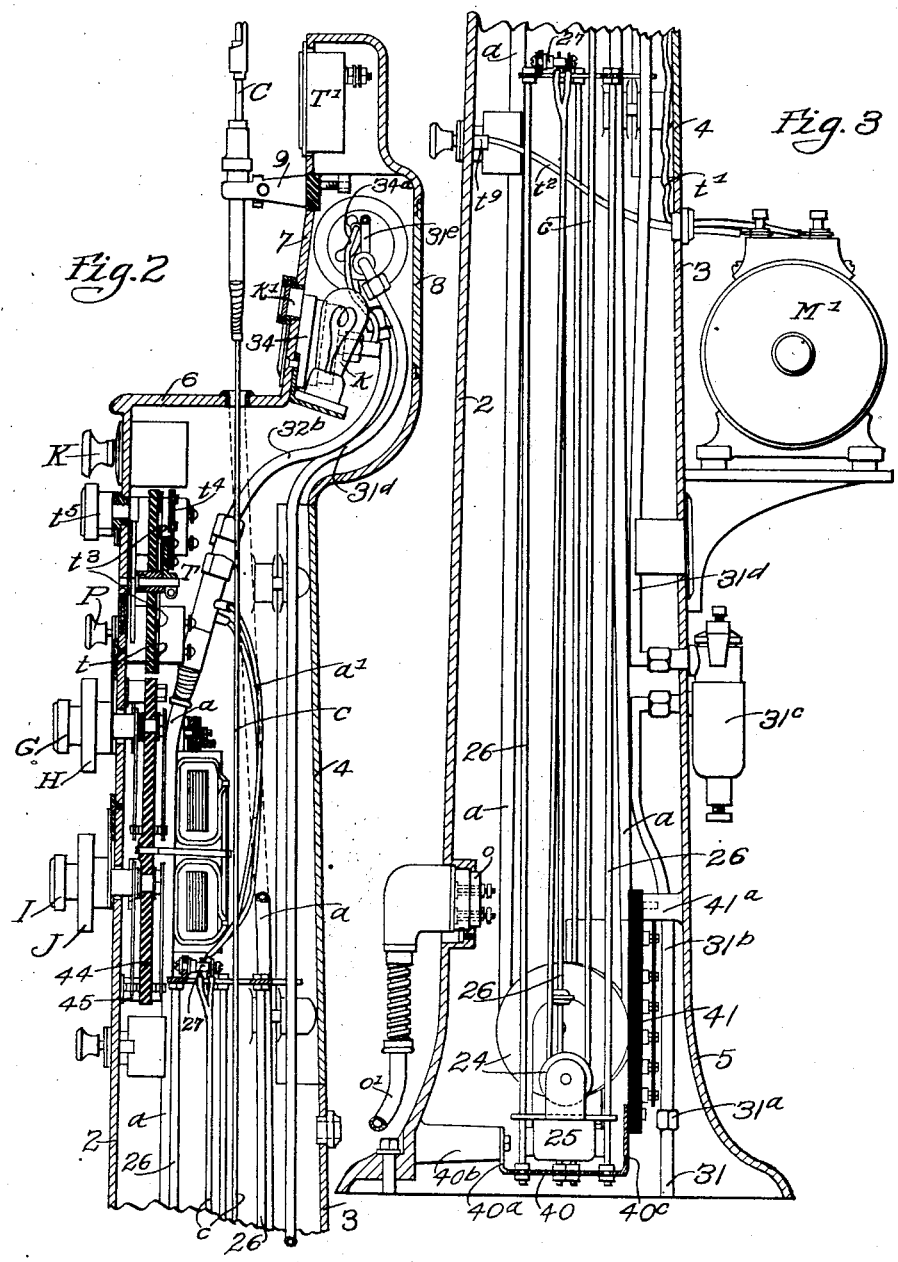

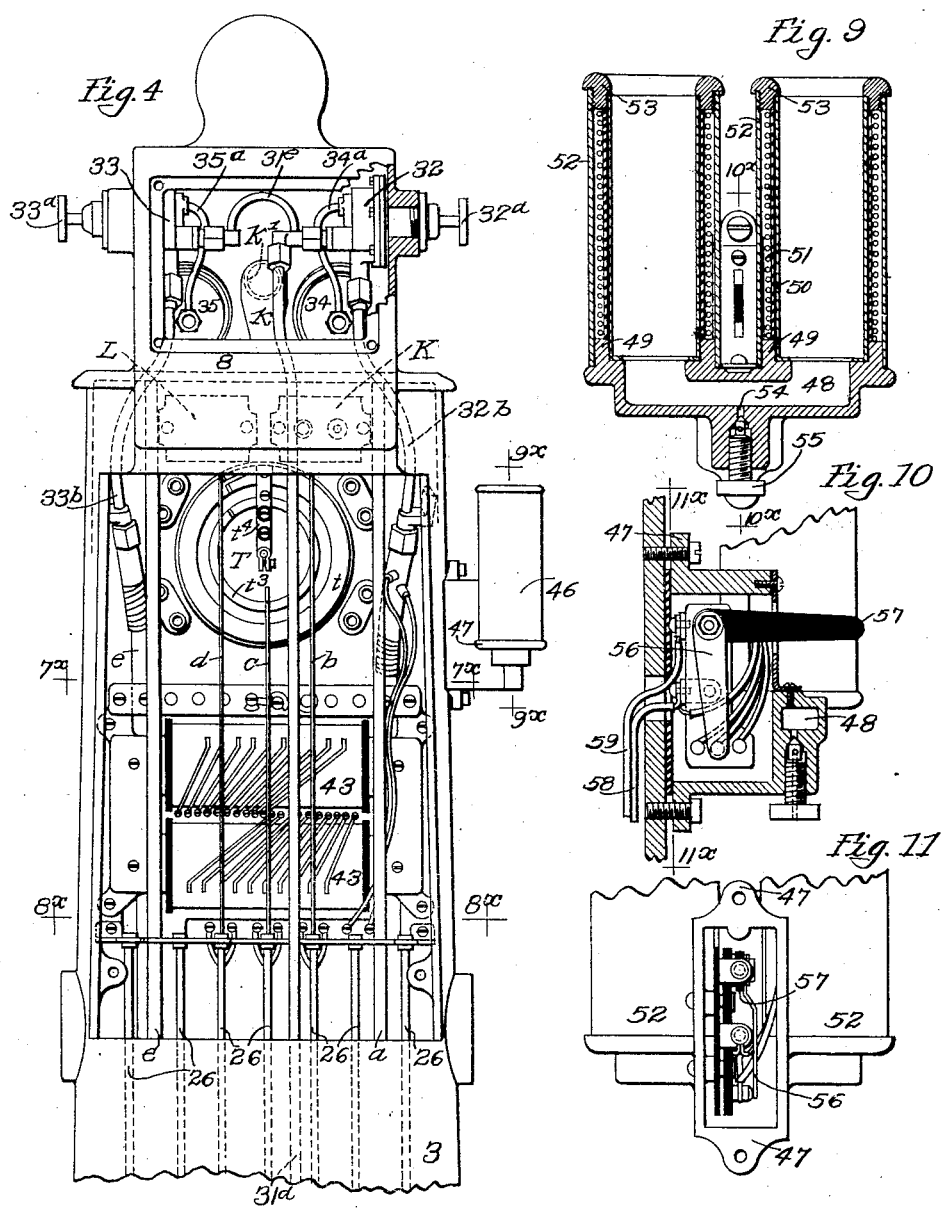

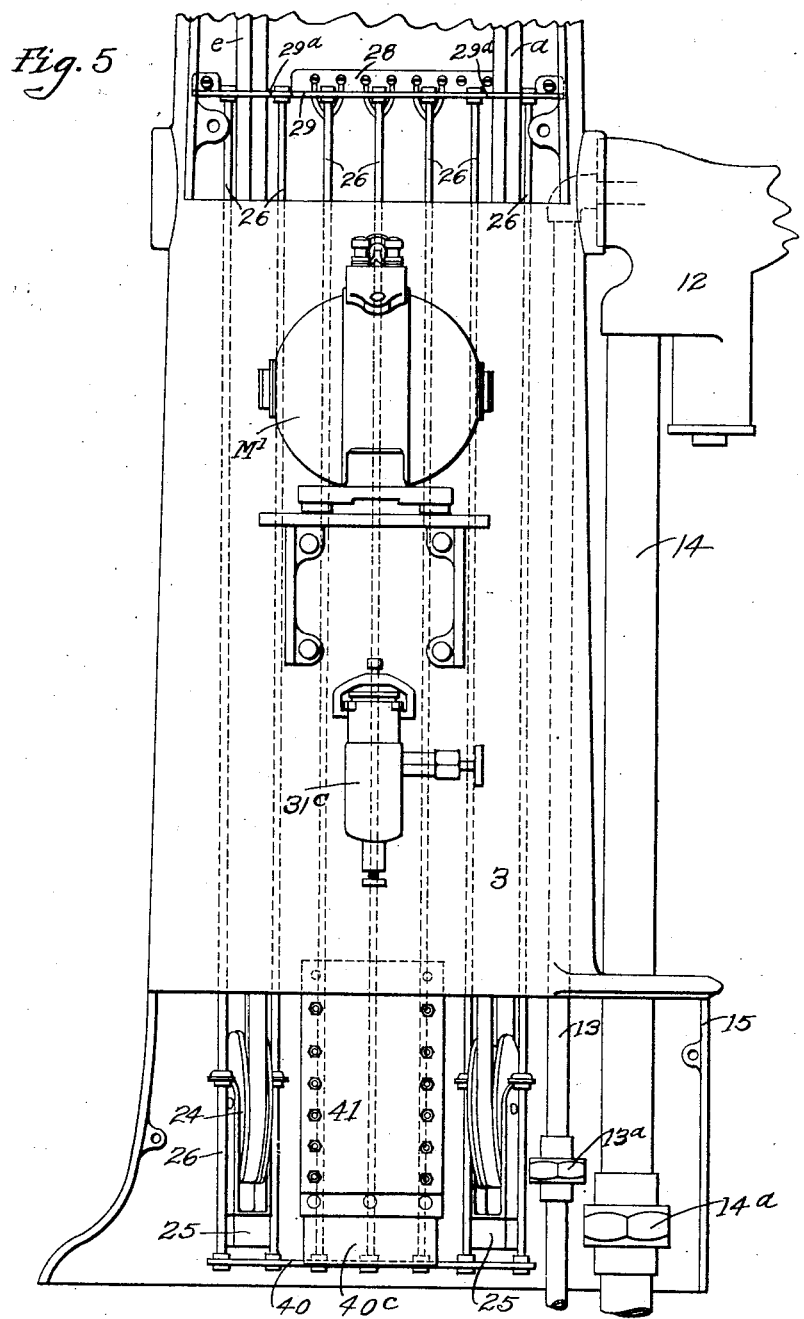

Jan. 1, 1929.
O. H. PIEPER ET AL
1,697,287
UNITARY DENTAL APPARATUS
Original Filed Sept. 5, 1917    6 Sheets-Sheet 5
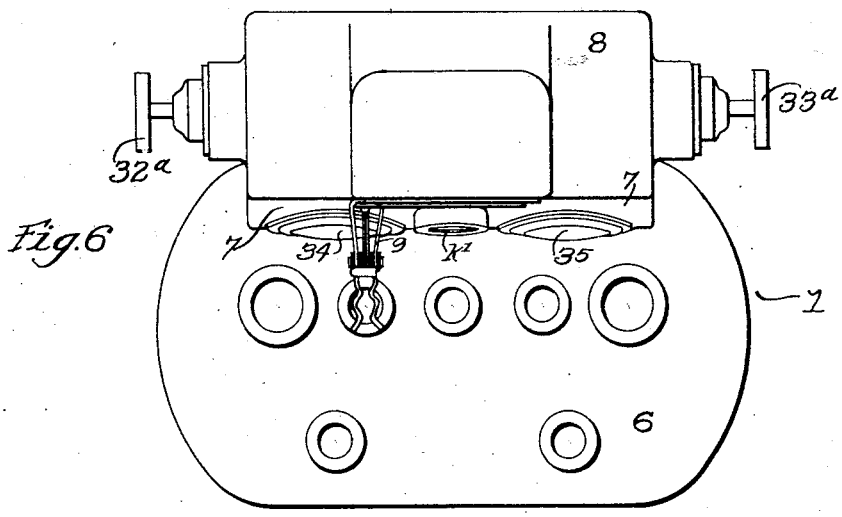
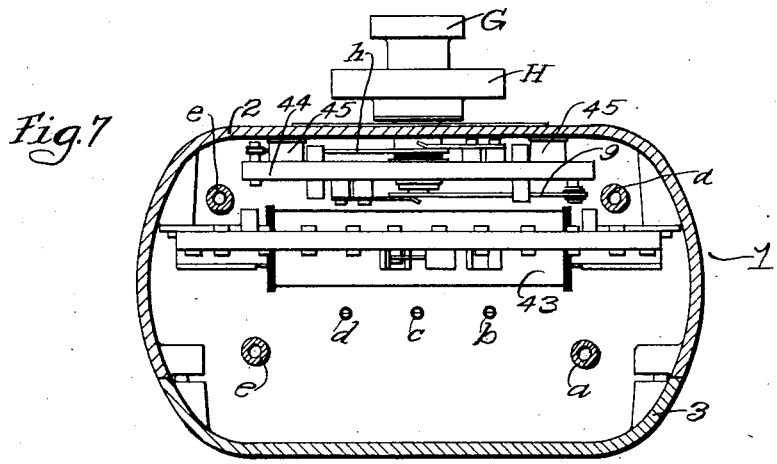
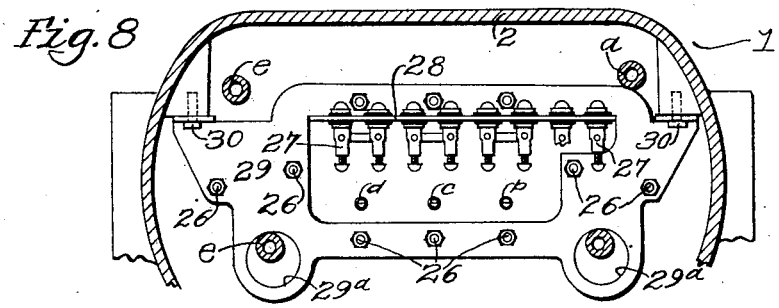
INVENTORS:
OSCAR H. PIEPER
ALPHONSE F. PIEPER
By Brown, Boettcher and Dienner
ATTYS.

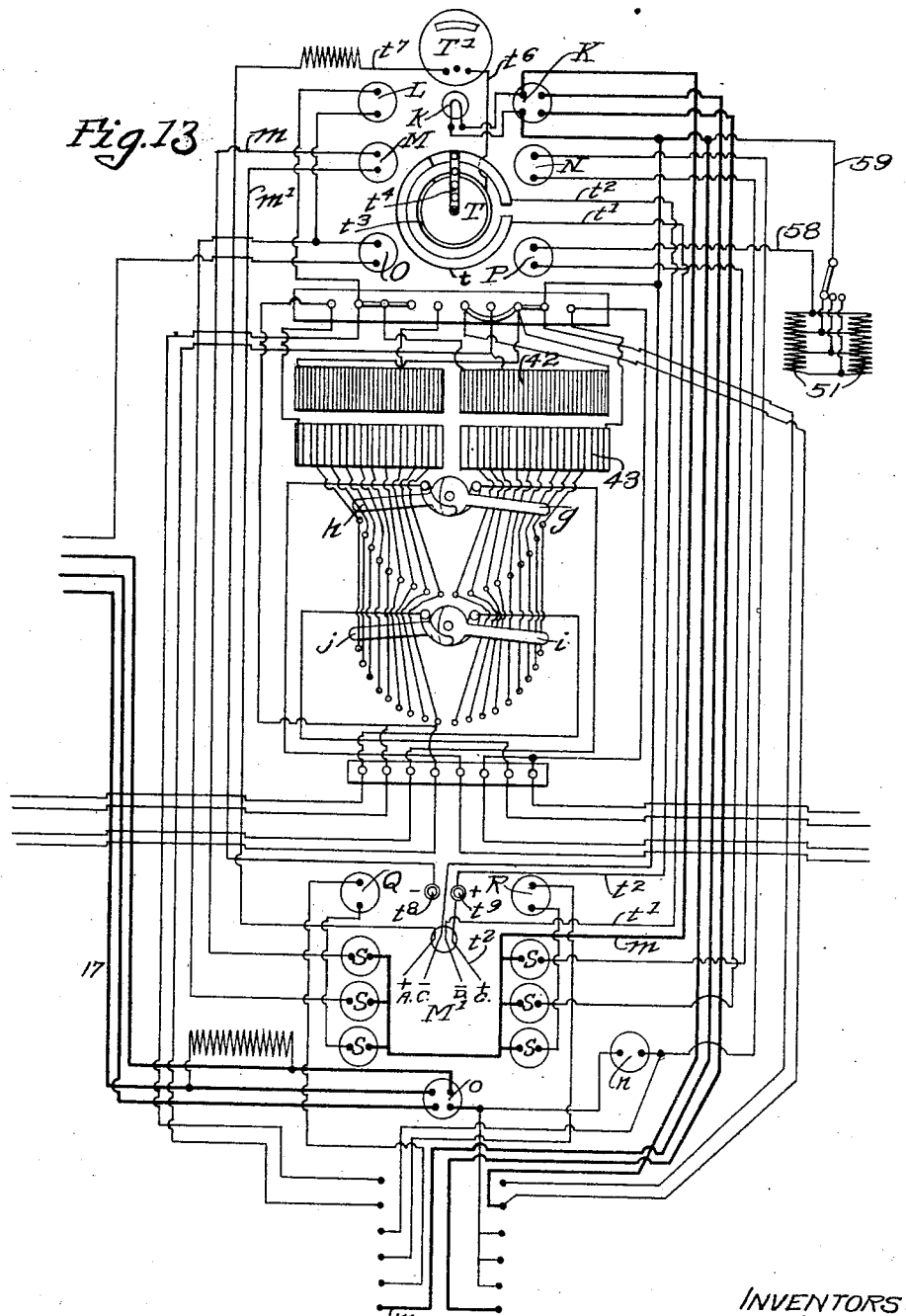

Patented Jan. 1, 1929.

1,697,287

UNITED STATES PATENT OFFICE.

OSCAR H. PIEPER AND ALPHONSE F. PIEPER, OF ROCHESTER, NEW YORK.

UNITARY DENTAL APPARATUS.

Original application filed September 5, 1917, Serial No. 189,825. Patent No. 1,376,356, dated April 26, 1921. Divided and this application filed September 3, 1920. Serial No. 407,986.

This application is divisional from our copending application, Serial No. 189,825, filed September 5, 1917, which issued as Patent No. 1,376,356 on April 26, 1921.

Our invention has for its object to provide an apparatus for the use of dentists which will facilitate the performance of various operations, in which it is intended to bring numerous instruments and pieces of mechanism, which a dentist is called upon to use most frequently, nearest at hand. With this end in view we have provided a unitary structure in which various appliances are assembled in juxtaposition and mounted upon a column, or standard, which may be located within each reach of the operator's position at the side of the dental chair, said standard having certain novel features of construction whereby the electrical apparatus, such as the dental motor, and control circuits thereof, and other mechanisms, are associated conveniently with the mouth instruments, comprising the hot air syringe, mouth mirrors and cautery, and the low voltage devices employed for supplying current thereto together with the operating means therefor. To these and other ends the invention consists in certain improvements and combinations of parts, all as will be hereinafter more fully described, the novel features being pointed out in the claim at the end of the specification.

In the drawings:

Figure 1 is a front elevation of a unitary apparatus constructed in accordance with our present invention;

Figures 2 and 3 are enlarged vertical sectional views taken on the line 2×—2× of Figure 1, the former showing the upper portion of the apparatus and the latter the bottom thereof;

Figure 4 is a detail rear elevation of the upper portion of the column, or pillar;

Figure 5 is a similar view of the bottom half thereof;

Figure 6 is a top plan view of the column;

Figure 7 is a horizontal sectional view taken on the line 7×—7× of Figure 4;

Figure 8 is a similar view taken on the line 8×—8× of Figure 4;

Figure 9 is a detail cross-sectional view taken on the line 9×—9× of Figure 4 illustrating the heaters for atomizer bottles;

Figure 10 is a detail illustration of the switch mechanism for the circuit of said heaters on the line 10×—10× of Figure 9;

Figure 11 is a rear view taken on the line 11×—11× of Figure 10;

Figure 12 is a detail sectional view of the upper end of the motor supporting arm and the contacts in the motor circuit permitting the motor to be rotated;

Figure 13 is a diagrammatic illustration of the circuits of the various pieces of electrical apapratus employed in conjunction with the different instruments.

Similar reference characters throughout the several drawings indicate similar parts.

To facilitate the work of a dentist we have brought into close relationship in a single apparatus those devices for which he has the most frequent use, and have assembled them on a support in the form of a column, in which the air pipes and cord circuits for the various instruments are concealed, as are also the circuit wires for the motor, and the water supply pipe for the cuspidor, this pipe, as well as the waste pipe, having union, or joint connections by means of which they may be attached to the service pipes of the building, arranged on the base of the column, where access may be conveniently had to them through a removable portion of the column. The hand instruments, such as the hot air syringe, the cautery, the examination lamp, and the air nozzle for the atomizers, are supported above the top of the column, and the air pipes and cord circuits for these various instruments are looped within the column. To this end the latter is made of sufficient height to provide loops in said cords of sufficient length to enable the apparatus to be located preferably at the left hand side of the operating chair in a position facing the operator, so that he may easily reach one or another of the instruments and carry it to the point of operation, irrespective of the adjustment of the dental chair itself.

The column, or pillar, indicated by 1, is preferably oval in cross section, as shown in Figures 6 and 7, providing the parallel front and rear faces 2 and 3, the former carrying on its inner side the various parts of the electrical apparatus which will be more fully described hereinafter, and the latter being provided with upper and lower openings which are normally closed by the removable panels 4 and 5. The column is provided at its top with the horizontal table portion 6, at the rear side of which is an upwardly extending offset top portion of the column comprising the front face 7 provided with a plurality of apertures, the side walls and the rear wall having an aperture normally closed by the cover-plate 8. This offset portion provides a support for the air gauges and certain devices indicating the electrical condition of the apparatus in a position where they can be observed by the operator at the moment an instrument is picked up, or selected. A further function of the offset top portion is the provision of a support for clips, or holders, for the various instruments, as indicated by 9 (Figures 2 and 6).

The position which the column, or pillar, is intended to occupy with reference to the operating chair permits its further use as a support for the usual cuspidor 10, and dental engine, or motor 11, both of which are mounted upon hollow bracket arms, or supports, preferably disposed at opposite sides of the column, one arm thus serving to counter balance the other. The arm which supports the cuspidor 10 is indicated by 12, and contains a water supply pipe 13 and the waste pipe 14, which may, or may not, be included wholly within the column. In Figure 5 we have shown the supply pipe located in the column, and the waste pipe disposed exteriorly; but whichever way these pipes are arranged we prefer, for the sake of neatness and general appearance of the apparatus when set up, that the lower ends of these pipes be included within the column, and to this end a pedestal extension 15 is provided at one side for the accommodation of the unions, or pipe couplings, 13$^a$ and 14$^a$, as shown in Figure 5.

The motor supporting arm, as indicated by 16, extends upwardly and contains a plurality of motor circuit wires 17 (Figure 12), which terminates in a corresponding number of insulated contact rings 18, mounted on the reduced upper end of the arm, and held in place thereon by the nut 19. The motor carrying member, indicated by 20, is attached to the motor at its pivotal point of support, 21, and curves over the motor and extends downwardly and forwardly into the plane of the axis of the armature 22, thus maintaining the center of gravity in alinement with the arm 16, and minimizing any tendency of the member 20 to bind in its bearing. The member 20 is also hollow, and at its lower end fits over the cylindrical portion of the arm 16, formed by the contact rings 18, and contains a number of spring contacts, or brushes 18$^a$, from which corresponding wires 18$^b$ extend to the motor terminals. The brushes 18$^a$ are mounted on an insulating plate 20$^a$, contained in enlargement 20$^b$ formed at the lower end of the member 20, which is closed by detachable plate 20$^c$.

In order to support the various hand instruments which the dentist is required to use in the most accessible position we mount the rectangular instrument tray 23 on the jointed arms 23$^a$ and 23$^b$, and pivot the latter on the bracket 16, preferably at a point just below the end of the motor carrying member 20, as will be seen in Figures 1 and 12.

The particular selection of the air and electrically operated hand instruments which we prefer to provide, are a hot air syringe A, a cautery B, one hand piece C for miscellaneous detachable instruments, such as canal dryer, antrum lamp, wax spatula, or bleacher point. The remaining instruments are the examination lamp D and the air nozzle E, which latter, it will be understood, is used in selective cooperation of one of the plurality of atomizers containing mouth washes, or antiseptic solutions. The air pipes for the syringe A and the nozzle E and the cord circuits for syringe A, and the remaining instruments B, C and D enter apertures in the horizontal table portion 6, and are looped therein around suitable counter balances comprising pulleys 24, carrying weights 25 and travelling on the parallel guide rods 26. The inner ends of the cord circuits are attached to binding posts 27 (Figure 8) carried on the flange 28 of a horizontal plate 29, which also comprises the support for the upper ends of the guide rods 26. The plate 29 is held in position by screws 30, which pass through ears on the plate and enter lugs formed within the column. The air pipes for the instruments A and E are indicated by $a$ and $e$ and the cord circuits for the instruments B, C and D are indicated respectively as $b$, $c$ and $d$. The hot air syringe A, which also comprises an electrical heating element, has a cord circuit, the conductors of which pass interiorly through the pipe $a$. These conductors are indicated by $a'$ in Figure 2, and are shown as extending upwardly from the binding post 27 to the point of attachment to the latter with the source of air supply.

The air is supplied to the pipes $a$ and $e$ under pressure from a suitable reservoir (not shown) from which the pipe 31 passes into the bottom of the column, where it is provided with the union 31$^a$, opposite the lower opening in said column. From this point the pipe continues upwardly as indicated by 31$^b$, to a suitable filter 31$^c$, preferably arranged exteriorly on the rear wall 3 of the column, so that the filtering medium therein may be easily replenished, as occasion requires. From the filter the pipe continues, as indicated by 31$^d$, to the two regulating valves 32 and 33, connection with the latter being through a branch 31$^e$. The valves 32 and 33 are mounted on the side walls of the offset top portion of the column and are provided with regulating knobs 32ª and 33ª respectively by means of which the higher air pressure may be reduced to the pressure which the operator may desire to use in operating instruments A and E. The hose flexible air pipes *a* and *e* are connected respectively with the outlet ports of the reducing valves, said connections being by means of the pipes 32ᵇ and 33ᵇ, shown particularly in Figures 2 and 4. The reducing valves 32 and 33 are arranged in the side walls of the offset portion of the column, and the air instruments A and E are located at the opposite ends of the row of instruments, so that the air pipes, because of their greater bulk, may be disposed near the lateral edges of the column, the portions thereof leading downwardly from the air gauges lying adjacent the front wall of the column and between it and the other devices supported thereon, while the upwardly extending loops of said air pipes are adjacent the rear wall of the column. In their upper course the air pipes *a* and *e*, are guided in apertures 29ª formed in ears at the rear corners of the plate 29.

Separate air gauges 34 and 35, corresponding to reducing valves 32 and 33 are fitted in two of the apertures in the front face 7 of the off set portion of the column. These gauges are connected with their respective valves by pipes 34ª and 35ª, and being adjacent the regulating valves and directly in rear of the air instruments they may be conveniently observed both when an instrument is selected and when a valve is regulated to increase, or decrease pressure. The lower ends of the guide rods 26, on which the counter balances for the cord circuits travel are supported by a plate 40, which is accessible through the opening at the base of the column. It is secured by an upwardly extending flange 40ª bolted to the lug 40ᵇ, and by a similar flange 40ᶜ at its forward edge, which serves as a support for the lower end of the circuit terminal board 41, the upper end of which is rigidly bolted to the ear 41ª projecting inwardly from the rear wall of the column above the lower opening.

In Figure 13 we have shown diagrammatically the various circuits provided for controlling the motor 11, and the various low voltage instruments, and as these circuits are substantially the same as those illustrated in Figure 15 of Letters Patent, No. 1,211,752, granted to us January 9, 1917, specific reference to each of the conductors and its individual terminal contacts need not be here made, but in order to facilitate an understanding of this view in conjunction with the mechanical part shown in other figures of the drawings, and also to bring out certain new features which we have incorporated in the apparatus, some of the parts will be referred to briefly.

The transformer which we have provided comprises the primary coils 42 and secondary coils 43 from which lead taps to switch terminals on a panel 44, which also supports the primary and secondary coils, and is attached permanently to studs 45 on the inner front face 2 of the column. Extending through the latter are the concentrically arranged switch operating members G and H and I and J attached to the inner and outer switch arms *g*, *h* and *i*, *j* respectively. The switches G, H, I and J control the voltage of current flowing through the cord circuits leading to the instruments A, B, C and D.

In the diagram, Figure 13, the main, or master switch, is indicated by K, which, it will be seen, in Figure 1, occupies the upper left hand location on the column just below the top 6. The main line conductors lead from the terminal board 41 to the master switch. By closing its contacts all the other portions of the apparatus are rendered serviceable, and by opening them the operator is assured that all current to the apparatus has been cut off. To afford a visual indication of the condition of the electrical apparatus the pilot light *k* is provided and associated with the switch K so that when the latter is closed the light is illuminated. The pilot lamp is preferably located in the top portion of the column in rear of the aperture *k'* in the front wall 7, which, in Figure 1, will be observed is between the gauges 34 and 35. When the switch K is operated to the closed position the other apparatus may be brought into circuit by closing additional switches, the one for the low voltage instruments being indicated by L. Other switches in the order in which they appear, reading downwardly on Figures 1 and 13 are as follows: M, for the ionization circuit; N, for the plug *n* to which a fan or an extra motor may be attached; O, for closing the circuit of the dental engine, or motor 11, in conjunction with the usual foot controller attached at *o* by means of the cable *o'*; P, a circuit for the bottle heaters; Q and R, are each switches which control circuits which may be idle and are provided for the accommodation of additional apparatus which the operator may wish to control from the column. A number of fuse plugs indicated diagrammatically, are inserted at necessary points, and in Figure 1 are shown as being accessible at the front of the column for convenience in replacing them when occasion requires.

In Figure 13 two new features are shown in the circuit arrangement, namely, an ionization current circuit from which a low voltage current is used as an agency in certain local treatments of teeth to facilitate the carrying of therapeutic agent, or medicament, to the desired point of application. Current is conveyed to the switch M, over the conductor $m$, thence by conductor $m'$ to the combined motor-transformer and motor-generator M', shown in Figure 3 and represented by the terminal abbreviations A. C.—D. C. in Figure 13. In the event alternating current is supplied the apparatus M' converts it into a direct current, whereas if direct current is received over the main line conductors through the master switch K at the usual high voltage it is stepped down to the desired amount of approximately 40 volts. The current thus supplied should be administered to the patient very gradually, and for this reason an ionization rheostat T is provided and split ring $t$ of graphite resistance is employed, the two ends of which are connected respectively with the positive and negative sides of the circuit leading from the motor-transformer, or motor-generator M', as represented by the wires $t'$ and $t^2$ respectively. Within the resistance ring $t$ is ring $t^3$, and cooperating with these two rings is a switch arm $t^4$, which is operated by a switch handle $t^5$, located at the center of the column near the upper end thereof. The ring $t^3$ of the switch is connected by the wire $t^6$ to the milliammeter T', occupying the uppermost portion of the off set top of the pedestal. The out-going conductor $t^7$, leading from the milliammeter, terminates in the plug socket $t^8$ and adjacent thereto is a similar socket $t^9$, which is in circuit with the positive wire $t^2$. The sockets $t^8$ and $t^9$ are intended to receive plugs on the two wires used for ionization purposes. In most instances the negative side of the circuit forms the electrode which is either held in the hand of the patient, or clamped to the cheek, while the other wire completes the circuit through the medicating needle, or instrument. It will be observed that the position of the switch arm $t^4$, with reference to the opening, or gap, in the ring $t$ determines the amount of current which flows through the millammeter and thence to the patient.

The assembled apparatus also embodies heaters 46, preferably arranged in pairs at opposite sides of the column, which are adapted to receive atomizer bottles, as will be understood. In Figures 9, 10 and 11, the detail construction of one of these pairs of heaters is shown, comprising a bracket 47 having at its outer edge a laterally extending hollow arm 48, provided with collars 49 within which are fitted sleeves 50 provided with insulation and carrying the resistance windings 51, which comprises the heating elements. The latter are surrounded by sheaths 52, which are united at their upper ends with the inner sleeves 50 by a collar 53. The opening in the arm 48 communicates with the interior of the heater, and leading therefrom is an opening 54, closed by a screw plug 55, which can be opened to drain the heater in the event fluid, or moisture, accumulates therein. The flow of current through the heating coils 51 is controlled by a switch having three terminal points as shown, with which cooperates a switch arm 56, adapted to be adjusted by handle 57 which projects outwardly between the pair of heater cups. One end of the heating coil of each cup is connected by a wire 58 to one pole of switch P and wiper 56 is connected by the wire 59 with one pole of the master switch K.

The present invention provides a means of locating in a most compact manner the low voltage electric instruments, air instruments and control devices for each, together with the high voltage apparatus, such as the dental motor, and such other mechanisms as the dentist may wish to use, in a most convenient and accessible form, all combined into a unitary structure capable of adjustment as a whole at the side of the operating chair.

We claim as our invention:

In a dental equipment, an ionization current circuit comprising a switch, a transformer, a motor-generator, means for connecting into circuit either said transformer or said motor generator, and a rheostat, said circuit being open at two plug and socket contacts, complementary plug and socket contacts for said first named plug and socket contacts, a medicating needle connected with one of said second named plug and socket contacts, and an electrode connected with the other of said second named plug and socket contacts.

In witness whereof, we hereunto subscribe our names this 27th day of July, 1920.

OSCAR H. PIEPER.
ALPHONSE F. PIEPER.